…

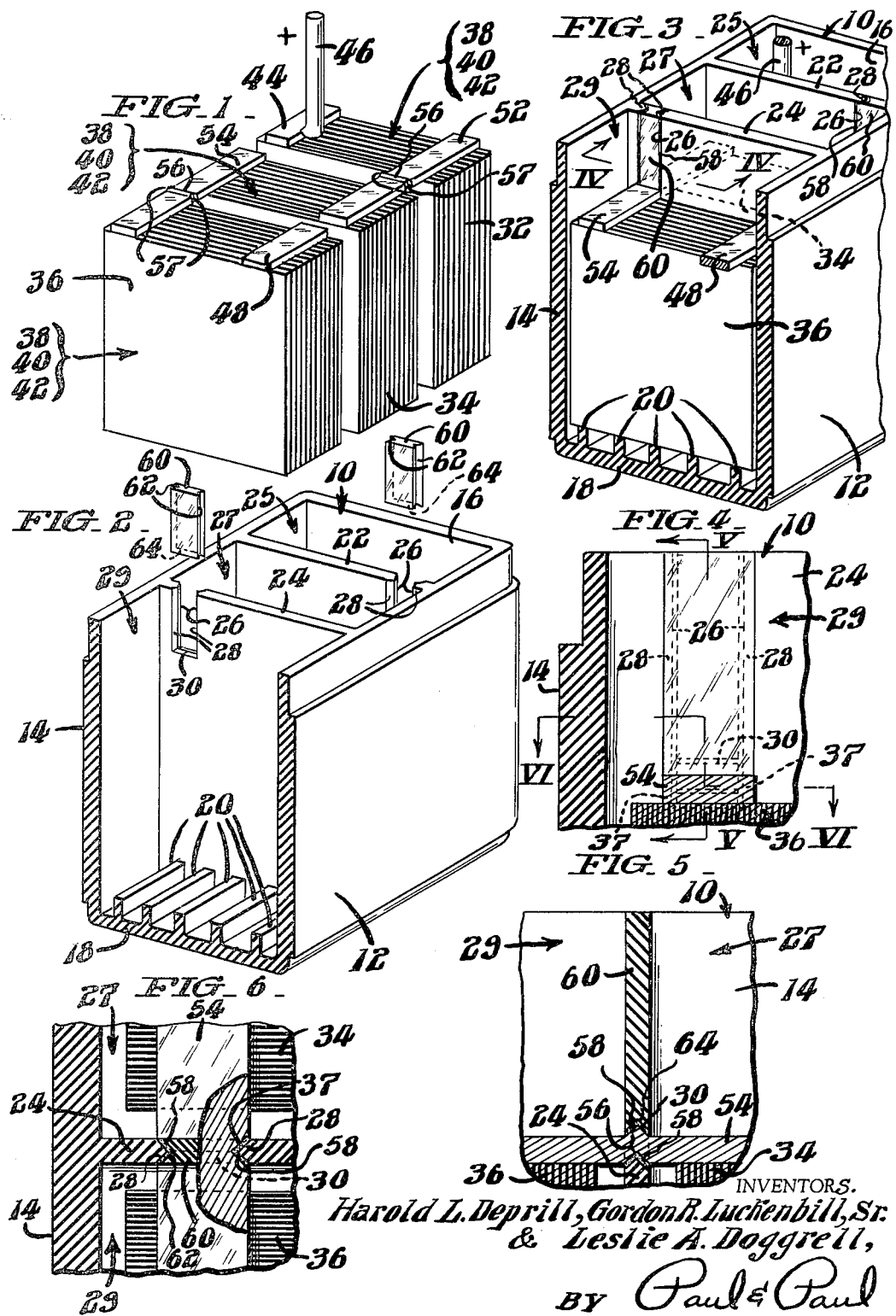

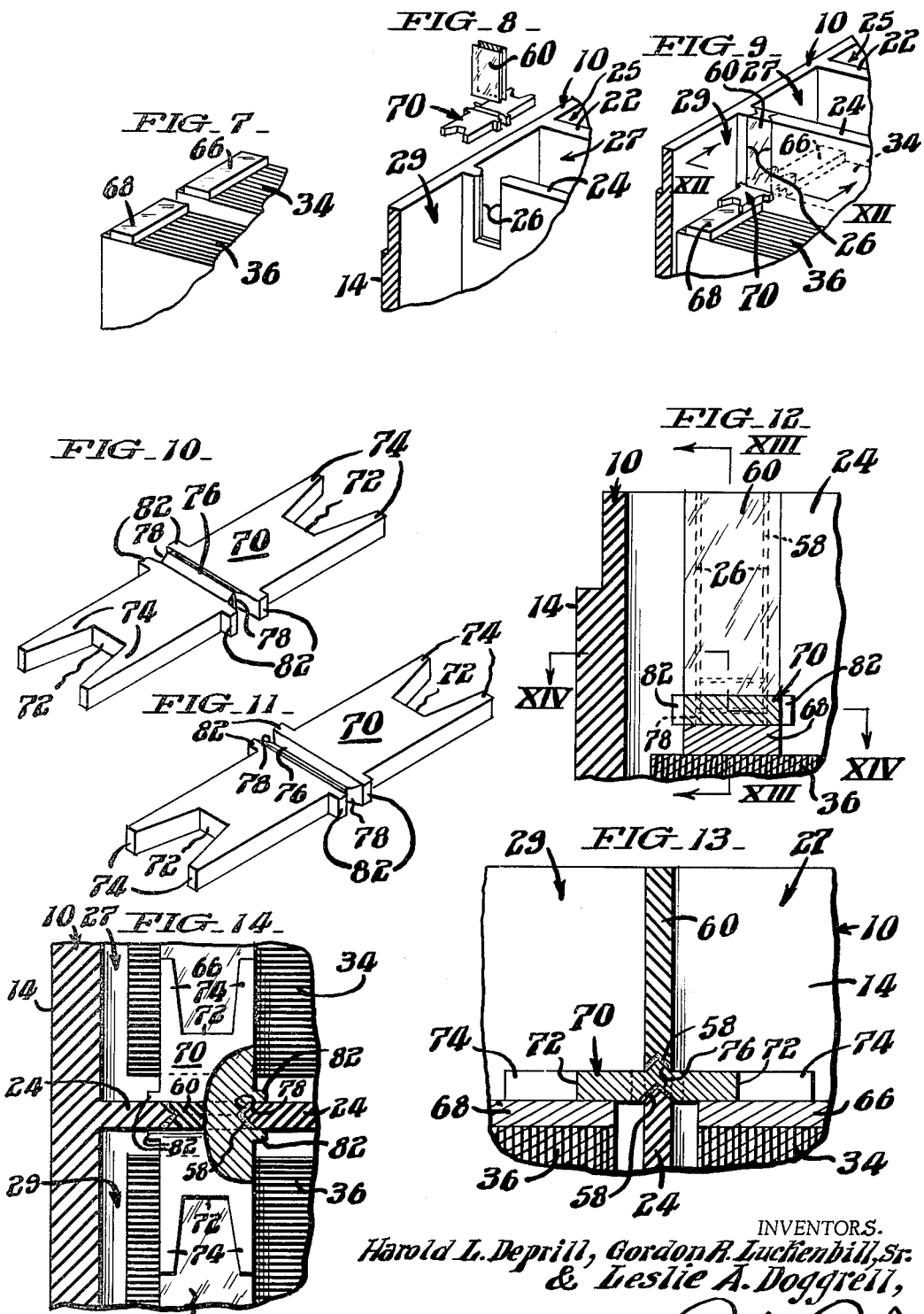

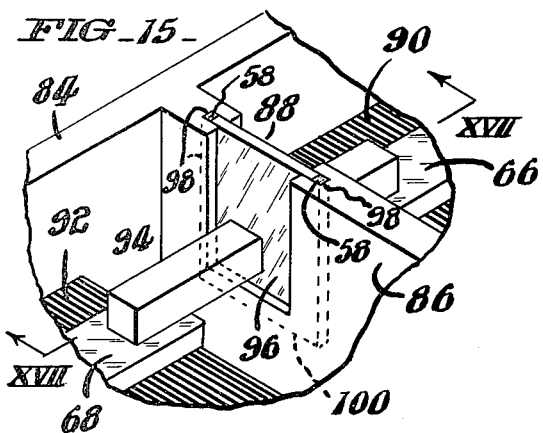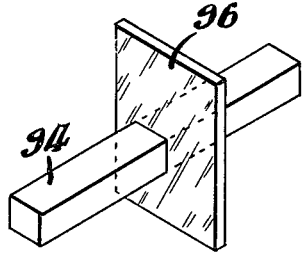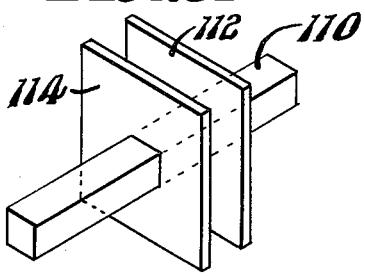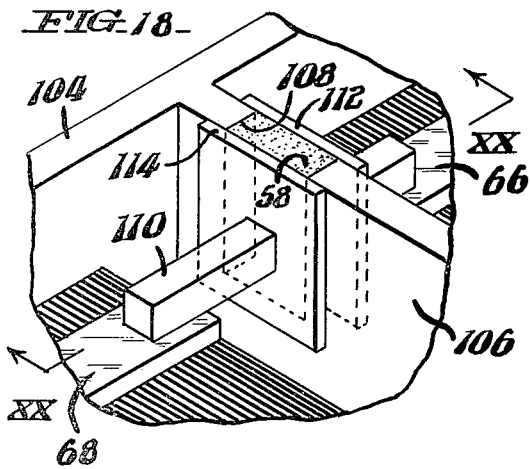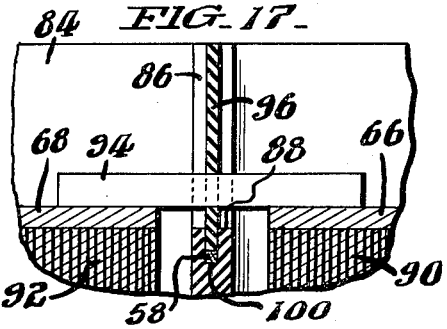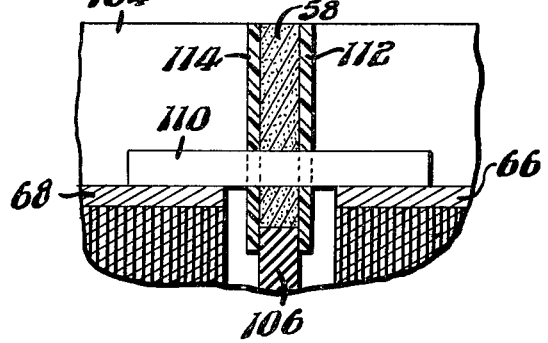
INVENTORS.
Harold L. Deprill, Gordon R. Luckenbill, Sr.
& Leslie A. Doggrell,
BY Paul & Paul
ATTORNEYS.

United States Patent Office 3,253,962
Patented May 31, 1966

3,253,962
STORAGE BATTERY
Harold L. Deprill, Reading, and Gordon R. Luckenbill, Sr., and Leslie A. Doggrell, Temple, Pa., assignors to General Battery and Ceramic Corp., Reading, Pa., a corporation of Pennsylvania
Filed Jan. 23, 1964, Ser. No. 339,636
2 Claims. (Cl. 136—134)

This invention relates generally to storage batteries, and particularly to improvements in the arrangement of multi-cell storage batteries of the type which have intercell connectors extending through partition walls.

An important object of the invention is to provide a multi-cell storage battery of the type aforesaid wherein the several elements of the battery, each comprising positive and negative plate groups and separators, may be pre-assembled for being lowered into the container as a single, unitary structure whereby to provide for more convenient and economical assembly.

Another object is to provide such a unitary structure with intercell connectors each cooperating with the partition wall through which it extends in a way to prevent seepage of electrolyte through the partition wall.

Another object is to provide such intercell connectors which extend directly between battery elements by the shortest possible straight line path whereby to effect economy in material and increase in efficiency.

Other objects of the invention will become apparent when the following description is read with reference to the accompanying drawings, in which:

FIGURE 1 is a perspective view of several elements of a storage battery constructed in accordance with the invention, showing the elements pre-assembled to afford a single, unitary structure before being lowered into the container;

FIGURE 2 is an exploded perspective view of a portion of a container, one end wall of the container being cut away;

FIGURE 3 is similar to FIGURE 2, but shows the unitary structure of FIGURE 1 lowered into the container and the partition wall sealed against seepage of electrolyte therethrough;

FIGURE 4 is a fragmentary vertical section on line IV—IV of FIGURE 3;

FIGURES 5 and 6 are fragmentary sections respectively on lines V—V and VI—VI of FIGURE 4;

FIGURE 7 is a fragmentary perspective view of elements of a modified battery arrangement;

FIGURE 8 is a fragmentary exploded perspective view of the modified battery arrangement;

FIGURE 9 is similar to FIGURE 8, but shows the elements of FIGURE 7 lowered into the container of FIGURE 8 and the partition wall sealed against seepage of electrolyte therethrough;

FIGURES 10 and 11 are enlarged perspective views of the intercell connector of the modified battery arrangement;

FIGURE 12 is a fragmentary vertical section on line XII—XII of FIGURE 9;

FIGURES 13 and 14 are fragmentary sections respectively on lines XIII—XIII and XIV—XIV of FIGURE 12;

FIGURE 15 is a fragmentary perspective view of a second modified battery arrangement;

FIGURE 16 is a perspective view of the intercell connector shown in FIGURE 15;

FIGURE 17 is a fragmentary vertical section on line XVII—XVII of FIGURE 15;

FIGURE 18 is a fragmentary perspective view of a third modified battery arrangement;

FIGURE 19 is a perspective view of the intercell connector shown in FIGURE 18; and FIGURE 20 is a fragmentary vertical section on line XX—XX of FIGURE 18.

The following descriptions are directed to the several specific forms of the invention illustrated in the drawings and are not intended to be addressed to the scope of the invention itself, which may be practiced in a wide variety of forms and arrangements.

Referring particularly to FIGURES 1 through 6, the exemplary storage battery constructed in accordance with the invention includes a container 10 provided with opposite side walls 12 and 14 and opposite end walls 16, only one of the latter being shown. The bottom wall of the container, designated 18, is provided with upstanding element rests 20. Within the container 10 are a pair of laterally spaced partition walls 22 and 24 dividing the interior of the container into three cells, respectively designated 25, 27 and 29. Adjacent the side wall 12, the partition 22 is provided with a recess 26, and adjacent the side wall 14, the partition 24 is provided with a recess 26. The recess 26 extends downwardly from the top of the partition and is provided with V-shaped vertically extending parallel opposite side edges 28, and with a V-shaped horizontally extending bottom edge 30.

Referring particularly to FIGURE 1, the elements of the battery are designated respectively 32, 34 and 36. Each of the elements comprises a positive plate group 38 and a negative plate group 40 separated by suitable members 42. The positive plates of element 32 are connected together by a post strap 44, and extending upwardly from the strap 44 is a positive terminal post 46. The negative plates of element 36 are connected together by a post strap 48, and extending upwardly from the strap 48 is a negative terminal post (not shown). The negative plates of element 32 are connected to the positive plates of element 34 by an intercell connector 52, and the negative plates of element 34 are connected to the positive plates of element 36 by an intercell connector 54. Each of the intercell connectors 52 and 54 is essentially a single flat bar having opposite end portions each extending across the associated battery element. Intermediate the ends of the bar is a transversely extending portion 56 of inverted V-shape at each end of which is a V-shaped groove 57.

After the elements 32, 34 and 36 have been fully assembled as shown in FIGURE 1 to afford a single unitary structure, the entire assembly is lowered into the container 10, the elements 32, 34 and 36 being received respectively by the cells 25, 27 and 29. The lower ends of the elements are seated upon the rests 20. When the elements are lowered into the container, the intercell connectors 52 and 54 are received respectively by the recesses 26 in the tops of the partition walls, with clearance all around. The space between each beveled edge 30 and the undersurface of the overlying inverted V-shaped portion 56 of the associated intercell connector is sealed with a suitable sealing compound 58.

In order to seal the partitions against leakage of electrolyte between the cells through the recesses 26, each recess 26 is provided with an insert or slide 60 having edges along its opposite sides with V-shaped grooves 62 and an edge along its lower end with a V-shaped groove 64. The slide fits loosely in the recess 26, but is sealed tight all around with sealing compound 58. An epoxy resin, type E–3, supplied by Atlas Mineral Products, Mertztown, Pennsylvania, is a suitable sealing compound.

It will be observed that the V-shaped grooves and edges of each recessed partition area and the associated insert 60 and portion 56 of the intercell connector effectively interlock, as shown.

Referring particularly to FIGURES 7 to 14, the modified form of the battery is similar to the embodiment of FIGURES 1 to 6, except that the intercell connector merely bridges the partition between the associated cells, instead of additionally having opposite end portions each extending across the associated element. The negative plates of the element 34 are connected together by a bar 66, and the positive plates of the element 36 are connected together by a bar 68. The bars 66 and 68 are interconnected by means of an intercell connector 70 essentially in the form of a flat bar, opposite ends of which are recessed, as at 72, to form pairs of legs 74. Intermediate the ends of the bar 70 is a transversely extending portion 76 of inverted V-shape, at each end of which is a notch 78 terminating in a V-shaped bottom. On opposite sides of each notch 78 are a pair of laterally spaced legs 82.

The assembly of the modified form of the battery is similar to the assembly of the embodiment of FIGURES 1 to 6. However, it should be noted that each of the intercell connectors 70, preferably, is welded to the bars 66 and 68 before the battery elements are lowered into the container.

Referring particularly to FIGURES 15, 16 and 17, the second modified form of the battery includes a container having a side wall 84 and a partition 86, the partition being recessed, as at 88. As in the embodiment of FIGURES 7 to 14, the intercell connector merely bridges the partition between the associated cells, instead of additionally having opposite end portions each extending across the associated element. The element 90 carries a connector 66 and the element 92 carries a connector 68. An intercell connector in the form of a bar 94 extends through the recess 88 and has opposite end portions seated upon and welded to the connectors 66 and 68. Molded to the intercell connector 94 is a plate 96, opposite side edges of which are slidably received in grooves 98 formed in the vertically extending edges of the recess 88, the lower horizontally extending edge of the plate 96 being received in a groove 100 formed in the lower edge of the recess 88. Extending about the edges of the plate 96 is a space sealed with sealing compound 58. The plate 96 preferably is made of the same material as the container, but may be made of any other suitable material, such as a plastic. Alternately, it may be formed of lead and made integral with the intercell connector 94.

The assembly of the second modified form of the battery is similar to the assembly of the embodiment of FIGURES 1 to 6. However, as in the assembly of the embodiment of FIGURES 7 to 14, each intercell connector 94, preferably, is welded to the bars 66 and 68 before the battery elements are lowered into the container. It will be observed that the plates 96 become a part of the unitary structure lowered into the container.

Now referring to FIGURES 18, 19 and 20, the third modified embodiment of the storage battery includes a container having a side wall 104 and a partition 106 provided with a recess 108. As in the embodiment of FIGURES 15, 16 and 17, the intercell connector is in the form of a bar 110 extending through the recess 108 and having opposite end portions seated upon and welded to the bars 66 and 68. The intercell connector 110 has molded thereto a pair of longitudinally spaced plates 112 and 114 disposed respectively upon opposite sides of the partition 106 and forming dams for a deposit of sealing compound 58. The plates 112 and 114 preferably are made of the same material as the container, but may be made of any other suitable material, such as a plastic. Alternately, they may be formed of lead and made integral with the intercell connector 110.

The assembly of the third modified form of the battery is similar to the assembly of the embodiment of FIGURES 15, 16 and 17. However, it will be noted that the plates 112 and 114 become parts of the unitary structure lowered into the container and that they slide over the partition on opposite sides thereof instead of sliding down into the recess formed in the partition.

It will be noted that each of the embodiments of the invention described hereinabove is characterized by an arrangement working for convenience and economy in assembly, and by intercell connectors extending by the shortest possible straight line path directly between battery elements whereby to effect economy in material and increase in efficiency.

What is claimed is:

1. In a storage battery, the combination comprising a covered container including a partition dividing the interior of the container into cells and having a recessed area at the top thereof, a battery element in each of said cells including a positive plate group and a negative plate group, a single bar disposed below the cover of said container and extended through said recess, with clearance all around, and directly between said battery elements by the shortest possible straight line path for interconnecting all of the positive plates of one battery element with all of the negative plates of the other battery element, and means sealing said partition against seepage of electrolyte from cell to cell through said recess including a closure slidaby fitted into said recessed partition area and disposed over said bar, and a sealing compound applied to the joints within said recessed area through which electrolyte might otherwise seep.

2. The combination defined in claim 1 wherein the recessed partition area, the closure for the recess and the portion of the bar which extends through the recess are formed to interlock each with the others.

References Cited by the Examiner

UNITED STATES PATENTS

| 1,758,506 | 5/1930 | Ford | 136—134 |
| 1,919,902 | 7/1933 | Nyce | 136—134 |
| 2,828,349 | 3/1958 | Haunz | 136—134 X |

References Cited by the Applicant

UNITED STATES PATENTS

| Re. 25,054 | 10/1961 | Rigsby. |
| 1,425,924 | 8/1922 | Willard. |
| 1,433,669 | 10/1922 | Towns. |
| 1,692,316 | 11/1928 | Smith. |
| 1,785,202 | 12/1930 | Lubeck. |
| 1,828,393 | 10/1931 | Chilton. |
| 1,880,323 | 10/1932 | Lindley. |
| 1,882,414 | 10/1932 | Ford. |
| 1,892,962 | 1/1933 | Patterson. |
| 1,907,420 | 5/1933 | Finn. |
| 1,934,945 | 11/1933 | Merlau et al. |
| 1,942,350 | 1/1934 | Appel et al. |
| 1,958,186 | 5/1934 | Dietrich. |
| 1,980,903 | 11/1934 | Blake. |
| 1,983,611 | 12/1934 | Jackson. |
| 1,988,111 | 1/1935 | Dunzweiler. |
| 2,002,267 | 5/1935 | Kyle. |
| 2,066,675 | 1/1937 | Dunzweiler. |
| 2,090,268 | 8/1937 | Reetz. |

(Other references on following page)

UNITED STATES PATENTS

| | | |
|---|---|---|
| 2,092,214 | 9/1937 | Janko. |
| 2,132,793 | 10/1938 | Kyle. |
| 2,180,959 | 11/1939 | Hopkins. |
| 2,189,327 | 2/1940 | Rieser. |
| 2,218,621 | 10/1940 | Norberg. |
| 2,221,542 | 11/1940 | Hopkins. |
| 2,395,652 | 2/1946 | Anderson. |
| 2,416,651 | 2/1947 | Smyth. |
| 2,496,709 | 2/1950 | Gelardin. |
| 2,521,800 | 9/1950 | Martinez et al. |
| 2,620,370 | 12/1952 | Chapman. |
| 2,637,758 | 5/1953 | Shannon. |
| 2,658,937 | 11/1953 | Chapman. |
| 2,692,906 | 10/1954 | Morgan. |
| 2,783,294 | 2/1957 | Anderson. |
| 2,890,262 | 6/1959 | Kendall et al. |
| 2,942,055 | 6/1960 | Doyle et al. |
| 3,003,011 | 10/1961 | Martin Artajo. |

WINSTON A. DOUGLAS, *Primary Examiner.*

D. L. WALTON, *Assistant Examiner.*